(12) United States Patent
Katusic et al.

(10) Patent No.: US 8,048,398 B2
(45) Date of Patent: Nov. 1, 2011

(54) PROCESS FOR PREPARING MIXED METAL OXIDE POWDERS

(75) Inventors: Stipan Katusic, Bad Soden (DE); Guido Zimmermann, Bruehl (DE); Michael Kraemer, Schoeneck (DE); Peter Kress, Karlstein (DE); Horst Miess, Kahl (DE)

(73) Assignee: Evonik Degussa GmbH, Essen (DE)

( * ) Notice: Subject to any disclaimer, the term of this patent is extended or adjusted under 35 U.S.C. 154(b) by 291 days.

(21) Appl. No.: 12/299,232

(22) PCT Filed: May 9, 2007

(86) PCT No.: PCT/EP2007/054479
§ 371 (c)(1),
(2), (4) Date: Oct. 31, 2008

(87) PCT Pub. No.: WO2007/144237
PCT Pub. Date: Dec. 21, 2007

(65) Prior Publication Data
US 2009/0087496 A1    Apr. 2, 2009

(30) Foreign Application Priority Data

Jun. 13, 2006  (DE) .......................... 10 2006 027 302

(51) Int. Cl.
| | |
|---|---|
| *C01B 13/00* | (2006.01) |
| *C01B 13/14* | (2006.01) |
| *C01C 1/00* | (2006.01) |
| *C01G 49/00* | (2006.01) |
| *C01G 25/00* | (2006.01) |
| *C01G 41/00* | (2006.01) |
| *C01G 9/00* | (2006.01) |
| *C01G 23/047* | (2006.01) |
| *C01G 30/00* | (2006.01) |
| *C01G 28/00* | (2006.01) |
| *B01J 23/00* | (2006.01) |
| *B01J 21/00* | (2006.01) |

(52) U.S. Cl. .............. 423/593.1; 423/592.1; 423/594.1; 423/594.2; 423/594.3; 423/594.4; 423/594.5; 423/594.6; 423/594.7; 423/594.8; 423/594.9; 423/594.12; 423/594.13; 423/594.14; 423/594.15; 423/594.16; 423/595; 423/596; 423/598; 423/599; 423/600; 423/604; 423/605; 423/606; 423/607; 423/608; 423/609; 423/610; 423/617; 423/618; 423/622; 423/624; 423/625; 423/636; 423/641; 502/300; 501/1

(58) Field of Classification Search ............. 502/104, 502/105, 107, 300–439; 106/426; 423/592.1, 423/593.1, 594.1, 594.2, 594.3, 594.4, 594.5, 423/594.6, 594.7, 594.8, 594.9, 594.12, 594.13, 423/594.14, 594.15, 594.16, 595, 596, 598, 423/599, 600, 604, 605, 606, 607, 608, 609, 423/610, 617, 618, 622, 624, 625, 636, 641; 501/1

See application file for complete search history.

(56) References Cited

U.S. PATENT DOCUMENTS

| | | | | |
|---|---|---|---|---|
| 4,119,707 | A * | 10/1978 | Thome et al. ............ | 423/594.17 |
| 5,807,531 | A * | 9/1998 | Hibst et al. ................. | 252/518.1 |
| 2004/0171480 | A1* | 9/2004 | Hampden-Smith et al. .. | 502/102 |
| 2004/0229036 | A1 | 11/2004 | Gottfried et al. | |
| 2005/0227864 | A1* | 10/2005 | Sutorik et al. ................ | 502/304 |
| 2006/0073092 | A1 | 4/2006 | Katusic et al. | |
| 2006/0233691 | A1* | 10/2006 | Vanderspurt et al. ......... | 423/263 |
| 2007/0037699 | A1 | 2/2007 | Katusic et al. | |
| 2007/0264174 | A1* | 11/2007 | Willigan et al. .............. | 422/222 |

FOREIGN PATENT DOCUMENTS

| | | |
|---|---|---|
| CN | 1569630 A | 1/2005 |
| CN | 1675132 A | 9/2005 |
| DE | 102 35 758 | 2/2004 |
| WO | 2005 028565 | 3/2005 |
| WO | 2006 134014 | 12/2006 |
| WO | 2007 144242 | 12/2007 |
| WO | 2007 144243 | 12/2007 |

OTHER PUBLICATIONS

Chinese Office Action issued on Jun. 11, 2010 in corresponding Chinese Application No. 200780021913.X (English Translation Only).

* cited by examiner

*Primary Examiner* — Cam N. Nguyen

(74) *Attorney, Agent, or Firm* — Oblon, Spivak, McClelland, Maier & Neustadt, L.L.P.

(57) ABSTRACT

Process for preparing a mixed metal oxide powder, in which oxidizable starting materials are evaporated and oxidized, the reaction mixture is cooled after the reaction and the pulverulent solids are removed from gaseous substances, wherein as starting materials, at least one pulverulent metal and at least one metal compound, the metal and the metal component of the metal compound being different and the proportion of metal being at least 80% by weight based on the sum of metal and metal component from metal compound, together with one or more combustion gases, are fed to an evaporation zone of a reactor, where metal and metal compound are evaporated completely under nonoxidizing conditions, subsequently, the mixture flowing out of the evaporation zone is reacted in the oxidation zone of this reactor with a stream of a supplied oxygen-containing gas whose oxygen content is at least sufficient to oxidize the starting materials and combustion gases completely.

14 Claims, No Drawings

PROCESS FOR PREPARING MIXED METAL OXIDE POWDERS

The invention relates to a process for preparing mixed metal oxide powders.

It is known that metal oxide powders can be prepared by means of pyrogenic processes. Usually, metal compounds are evaporated and the vapors are converted to the oxides in a flame in the presence of oxygen. The disadvantage of this process lies in the availability of metal compounds whose evaporation temperature is only so great that they can be evaporated under economically viable conditions. These may, for example, be silicon tetrachloride, titanium tetrachloride or aluminum chloride, which are used to prepare the corresponding metal oxide powders on the industrial scale. Another disadvantage is that there are only a few materials for evaporators which are stable at high evaporation temperatures, often under corrosive conditions. This leads to the fact that the number of pyrogenic metal oxides preparable by this process is limited.

DE-A-10212680 and DE-A-10235758 disclose processes for preparing (doped) zinc oxide powders, in which zinc powder is first evaporated in a nonoxidizing atmosphere in an evaporation zone of a reactor, and then cooled in a nucleation zone to temperatures below the boiling point of zinc. In the nucleation zone, a dopant is optionally supplied in the form of an aerosol. Subsequently, the mixture leaving the nucleation zone is oxidized. The process is notable in that the nucleation step forms zinc species which impart particular properties to the later (doped) zinc oxide.

In this process, there is, however, the risk of formation of cold surfaces and associated condensation of metal vapour. These processes are therefore suitable mainly for low metal vapour concentrations and therefore, in terms of economic viability, only of interest for the preparation of specific (doped) zinc oxide powders.

It was therefore an object of the invention to provide a process for preparing metal oxide powders which does not have the disadvantages of the known processes. In particular, the process shall be performable inexpensively.

The invention provides a process for preparing a mixed metal oxide powder, in which
   oxidizable starting materials are evaporated in an evaporation zone of a reactor and oxidized in the vaporous state in an oxidation zone of this reactor,
   the reaction mixture is cooled after the reaction and the pulverulent solids are removed from gaseous substances,
wherein
   as starting materials,
      at least one pulverulent metal and
      at least one metal compound,
      the metal and the metal component of the metal compound being different and
      the proportion of metal being at least 80% by weight based on the sum of metal and metal component from metal compound,
   together with one or more combustion gases, are fed to an evaporation zone of a reactor, where metal and metal compound are evaporated completely under nonoxidizing conditions,
   subsequently, the mixture flowing out of the evaporation zone is reacted in the oxidation zone of this reactor with a stream of a supplied oxygen-containing gas whose oxygen content is at least sufficient to oxidize the starting materials and combustion gases completely.

In the process according to the invention, the temperatures needed for the evaporation and oxidation can be provided by a flame which is formed by igniting a combustion gas with an oxygenous gas, where $0.5 \leq \text{lambda} \leq 1$ in the evaporation zone and $1 < \text{lambda} \leq 10$ in the oxidation zone.

The lambda value is defined as the quotient of the oxygen content of the oxygen-containing gas divided by the oxygen demand which is required for the complete oxidation of the combustion gas, of the metal and of further metal compounds, in each case in mol/h.

Suitable combustion gases may be hydrogen, methane, ethane, propane, natural gas, acetylene, carbon monoxide or mixtures of the aforementioned gases. The temperature needed to evaporate the starting materials can be provided by virtue of a suitable selection of the aforementioned gases and the oxygen content of the flame. Preference is given to using hydrogen or mixtures with hydrogen.

Particular preference is given to an embodiment in which $0.65 \leq \text{lambda} \leq 0.95$ in the evaporation zone and $1.3 \leq \text{lambda} \leq 6$ in the oxidation zone.

The temperatures in the evaporation zone and oxidation zone are, independently of one another, generally 500° C. to 3000° C. They are guided principally by the physical properties, for example boiling point or vapour pressure, of the starting materials to be evaporated and to be oxidized.

The mean residence time of the starting materials in the evaporation zone and in the oxidation zone can be varied over the reactor dimensions and is therefore not limiting. An economically viable magnitude for the mean residence time in the evaporation zone and oxidation zone is, independently of one another, 5 ms to 30 s.

The temperatures and the residence times in evaporation zone and oxidation zone should, in the process according to the invention, be adjusted such that there is no significant sintering of the particles. The suitable conditions with regard to temperatures and residence times depend upon the metals and, if appropriate, of further metal compounds, and should be determined in each case by experiments. The process is preferably performed so as to result in nanoscale particles having a mean diameter, based on primary particles, of less than 100 nm, more preferably of less than 50 nm.

The process according to the invention can be performed at different pressures, preferably at 200 mbar to 1100 mbar. Low pressures are advantageous owing to the resulting low evaporation temperatures.

The number of starting materials used is unlimited, provided that they are evaporable and oxidizable. It is thus possible to prepare mixed metal oxides with any composition of the metal components. The process according to the invention is especially suitable for preparing binary and ternary mixed metal oxides.

An essential component of the invention is the content of pulverulent metal of at least 80% by weight based on the sum of metal and metal components from metal compounds. The content of pulverulent metal is preferably at least 90% by weight, more preferably at least 95% by weight.

The pulverulent metal may preferably be selected from the group comprising Ag, Al, Ba, Bi, Ca, Er, Eu, Ga, In, Li, K, Mg, Mn, Na, Pb, Sb, Sm, Sn, Sr, Te, Th, Yb or Zn. More preferably, Zn may be used. It is equally possible to use alloys of the aforementioned metals, for example alloys of zinc and magnesium, zinc and aluminum or zinc and manganese.

The metal compound itself may be supplied to the evaporation zone in solid form, in dissolved or dispersed form in an aqueous phase, or in the form of vapour.

When a metal compound is used in solid form or vaporous form, it is advantageous when the carbon content is low.

Should the content of the mixed oxide component emanating from the metal compound be more than 5% by weight, it is particularly advantageous to use carbon-free metal compounds.

When the metal compound is used in the form of an aqueous solution or aqueous dispersion, the proportion of water, based on the solution or the dispersion, should preferably be at least 80% by weight, more preferably at least 90% by weight.

The metal compound introduced into the evaporation zone as a solution or dispersion is preferably an inorganic metal compound or an organic metal compound having not more than 4 carbon atoms, for example acetates, oxalates, propionates, methoxides, ethoxides or isopropoxides.

When the metal compounds are used as described, the result is mixed metal oxide powder with particularly low carbon content. Moreover, soot formation in the reactor is very substantially or completely prevented.

The dimensions of the starting materials introduced as solids in the process according to the invention are at first unlimited, since it is possible to control through variation of further process parameters such as temperature and mean residence time and the evaporation of the solids. The particle size is preferably less than 1000 µm, particular preference being given to values of less than 100 µm.

In the process according to the invention, further metal compounds dissolved or dispersed in a solvent or vaporous metal compounds can be introduced directly into the oxidation zone. The metal component of these metal compounds may be the same as or different from the metal or metal compound introduced into the evaporation zone. In the case of the dissolved or dispersed metal compounds, the evaporation and the oxidation are effected within the oxidation zone. In this case, the type of the metal compounds is not restricted, provided that they are oxidizable and are evaporable under the conditions in the oxidation zone. It is possible to use either inorganic or organic metal compounds. The solvents used may be water or organic solvents, such as ethanol, methanol, propanol, butanol, 2-ethylhexanol, formic acid, acetic acid or 2-ethyl-hexanoic acid.

The content of the metal compounds introduced into the oxidation zone is preferably not more than 10% by weight, more preferably not more than 5% by weight, based on the pulverulent metal introduced into the evaporation zone.

The metal compounds are preferably sprayed into the evaporation zone and into the oxidation zone. In this case, at least one one-substance nozzle can generate a very fine droplet spray at pressures up to 1000 bar, mean droplet size depending on the pressure in the nozzle between <1-500 µm. In addition, a two-substance nozzle may be used at pressures up to 100 bar. The droplets can be generated by using one or more two-substance nozzles, in which case the gas used in the two-substance atomization may be reactive or inert.

The concentration of the metal compounds in the solutions may be varied within wide limits and depends, for example, on the solubility of the metal compound used or the proportion of the metal component from the metal compound in the later mixed oxide powder. In general, the concentration of the metal compound, based on the solution, is 1 to 30% by weight.

The metal compounds used may preferably be chlorides, nitrates, sulfates, carbonates, $C_1$-$C_{12}$-alkoxides, $C_1$-$C_{12}$-carboxylates, acetylacetonates or carbonyls with Ag, Al, As, Au, B, Ba, Be, Bi, Ca, Cd, Ce, Co, Cr, Cs, Cu, Er, Eu, Fe, Ga, Gd, Ge, Hf, In, K, La, Li, Mg, Mn, Mo, Na, Nb, Nd, Ni, P, Pb, Pd, Pm, Pr, Pt, Rb, Ru, Sb, Sc, Sm, Sn, Sr, Ta, Tb, Ti, Tl, Tm, V, W, Y, Yb, Zn or Zr as the metal component.

More preferably, $C_1$-$C_4$-alkoxides or the $C_2$-$C_8$-carboxylates of the metals Al, B, Ce, Fe, Ga, In, Li, Mg, Mn, Sb, Sn or Zn may be used.

$C_1$-$C_4$-Alkoxides include branched and unbranched, saturated alkoxides such as methoxides, ethoxides, isopropoxides, n-propoxides, n-butoxides, isobutoxides, sec-butoxides and tert-butoxides. $C_2$-$C_8$-Carboxylates include salts of branched and unbranched, saturated carboxylic acids such as acetic acid, propionic acid, butanoic acid, pentanoic acid, hexanoic acid, heptanoic acid, octanoic acid and 2-ethylhexanoic acid. $C_1$-$C_4$-Alcohols include branched and unbranched, saturated alkoxides such as methanol, ethanol, isopropanol, n-propanol, n-butanol, isobutanol, sec-butanol and tert-butanol. $C_2$-$C_8$-Carboxylic acids include branched and unbranched, saturated carboxylic acids such as acetic acid, propionic acid, butanoic acid, pentanoic acid, hexanoic acid, heptanoic acid, octanoic acid and 2-ethylhexanoic acid.

Most preferably, $C_2$-$C_8$-carboxylates of the metals Al, Ce, Mn or Zn may be used dissolved in the corresponding $C_2$-$C_8$-carboxylic acid.

The removal of the mixed oxide powder from the hot reaction mixture is generally preceded by a cooling process. This process can be implemented directly, for example by means of a quench gas such as air or oxygen, or indirectly, for example by means of external cooling. The mixed oxide powder can be removed from gaseous substances by means of apparatus known to those skilled in the art, for example filters.

Particular preference is given to an embodiment of the process according to the invention in which the pulverulent metal introduced into the evaporation zone is zinc, the pulverulent metal compound introduced into the evaporation zone is an inorganic or organic metal compound which has not more than 4 carbon atoms and is of aluminum, cerium or manganese as the metal component, the proportion of zinc is at least 95% by weight, based on the sum of zinc and metal component from metal compound, lambda is 0.8 to 0.95 in the evaporation zone, lambda is 1.5 to 6 in the oxidation zone.

Particular preference is further given to an embodiment in which the pulverulent metal introduced into the evaporation zone is zinc, the solution of the metal compound introduced into the evaporation zone is an aqueous solution of an inorganic or organic metal compound which has not more than 4 carbon atoms and is of aluminum, cerium or manganese as the metal component, the proportion of zinc being at least 80% by weight, based on the sum of zinc and metal component from metal compound, lambda is 0.8 to 0.95 in the evaporation zone, lambda is 1.5 to 6 in the oxidation zone.

Particular preference is further given to an embodiment in which the pulverulent metal introduced into the evaporation zone is zinc, the solution of the metal compound introduced into the evaporation zone is an aqueous solution of an inorganic or organic metal compound which has not more than 4 carbon atoms and is of aluminum, cerium or manganese as the metal component, the solution of the metal compound introduced into the oxidation zone is a solution of a $C_2$-$C_8$-carboxylate or $C_1$-$C_4$-alkoxide of aluminum, cerium or manganese as the metal component in $C_1$-$C_4$-alcohols and/or $C_2$-$C_8$-carboxylic acids, the proportion of zinc being at least 80% by weight, based on the sum of zinc and metal component from metal compound, lambda is 0.8 to 0.95 in the evaporation zone, lambda is 1.3 to 6 in the oxidation zone.

The invention further provides for the use of the mixed metal oxide powder prepared by the process according to the invention as a filler, as a carrier material, as a catalytically active substance, as a ceramic raw material, as a cosmetic and pharmaceutical raw material.

EXAMPLES

Example 1

1000 g/h of zinc powder (particle size=5 µm) and 1000 g/h of a solution of manganese acetate in water (manganese acetate content 10% by weight) are sprayed by means of a nitrogen stream (2.5 m³ (STP)/h into an evaporation zone where a hydrogen/air flame (hydrogen 8.1 m³ (STP)/h, air 15.4 m³ (STP)/h) burns.

Evaporation zone conditions: lambda: 0.75, mean residence time: 100 ms, temperature: 1100° C.

Subsequently, 30 m³ (STP)/h of oxidation air are added to the reaction mixture.

Oxidation zone conditions: lambda: 5.9, mean residence time: 70 ms, temperature: 800° C.

To cool the hot reaction mixture, 150 m³ (STP)/h of quench air are added. Subsequently, the resulting powder is removed from the gas stream by filtration.

The powder contains 96.8% by weight of ZnO and 3.2% by weight of MnO. The BET surface area is 25 m²/g.

Examples 2 to 9 are preformed analogously to the example with the feedstocks and reaction conditions specified in the table.

Also listed in the table is the composition of the resulting mixed oxide powder and its BET surface area.

Example 2 is a comparative example in which the evaporation is effected under oxidizing conditions.

It is possible by the process according to the invention to obtain mixed metal oxide powders whose main component is obtained by evaporation and oxidation of a metal powder. Compared to the prior art, the following advantages arise:

The origin of the main component of the mixed oxide powder is a metal, which is generally cheaper than organometallic starting compounds which are used in the prior art.

No external evaporation of the feedstocks is necessary. This allows capital costs to be saved.

The process according to the invention allows the preparation of a series of mixed metal oxide powders which would be preparable only with difficulty, if at all, by the prior art methods.

TABLE

| | | | | | | |
|---|---|---|---|---|---|---|
| | | | Feedstocks, reaction conditions and powder properties | | | |
| | Example | | 1 | 2 (comp.) | 3 | 4 |
| Evaporation zone | Metal powder flow rate | g/h | Zn 1000 | Zn 1000 | Mg 800 | Zn/Mg[2)] 1000 |
| | Metal compound flow rate | g/h | Manganese acetate[1)] 1000 | Manganese acetate[1)] 1000 | Manganese acetate[1)] 1000 | Manganese acetate[1)] 1000 |
| | Combustion gas flow rate | m³ (STP)/h | $H_2$ 8.1 | $H_2$ 8.1 | $H_2$ 8.1 | $H_2$ 8.1 |
| | Air | m³ (STP)/h | 15.4 | 30 | 15.4 | 15.4 |
| | Lambda | | 0.75 | 1.5 | 0.72 | 0.76 |
| | Residence time ø | ms | approx. 1000 | approx. 700 | approx. 1000 | approx. 1000 |
| | Temperature | ° C. | 1100 | 950 | 1100 | 1100 |
| Oxidation zone | Oxidation air | m³ (STP)/h | 30 | 15 | 30 | 30 |
| | Metal compound flow rate | g/h | — | — | — | — |
| | Lambda | | 5.9 | not def. | 5.9 | 6.4 |
| | Residence time ø | ms | 70 | 70 | 70 | 70 |
| | Temperature | ° C. | 800 | 800 | 800 | 800 |
| Quench zone | Quench gas | m³ (STP)/h | 150 | 150 | 150 | 150 |
| | Temperature | ° C. | 300 | 300 | 300 | 300 |
| Mixed oxide powder | Composition | % by wt. | ZnO: 96.8 MnO: 3.2 | ZnO: 96.8 MnO: 3.2 | ZnO: 97.0 MnO: 3.0 | ZnO: 84.4 MgO: 12.5 MnO: 3.1 |
| | BET surface area | m²/g | 25 | 5 | 45 | 30 |
| | Example | | 5 | 6 | 7 | 8 | 9 |
| Evaporation zone | Metal powder flow rate | g/h | Sn 400 | Ca 600 | Ni 300 | Mg 600 | Zn 1000 |
| | Metal compound flow rate | g/h | $TiCl_4$[3)] 200 | $Al(NO_3)_3$[4)] 3000 | $Cu(NO_3)_2$[4)] 500 | Sodium acetate[4)] 500 | Manganese acetate[1)] 1000 |
| | Combustion gas flow rate | m³ (STP)/h | $H_2$ 8.1 | $H_2$ 8.1 | $H_2$ 8.1 | $H_2$ 8.1 | $H_2$ 8.1 |
| | Air | m³ (STP)/h | 15.4 | 15.4 | 15.4 | 15.4 | 15.4 |
| | Lambda | | 0.78 | 0.77 | 0.78 | 0.76 | 0.75 |
| | Residence time ø | ms | approx. 1000 | approx. 1000 | approx. 1000 | approx. 1000 | approx. 1000 |
| | Temperature | ° C. | 1100 | 1100 | 1100 | 1100 | 1100 |
| Oxidation zone | Oxidation air | m³ (STP)/h | 30 | 30 | 30 | 30 | 30 |
| | Metal compound flow rate | g/h | — | — | — | — | Cerium 2-ethylhexanoate[5)] 500 |

TABLE-continued

Feedstocks, reaction conditions and powder properties

|   |   |   |   |   |   |   |   |
|---|---|---|---|---|---|---|---|
|   | Lambda |   | 6.9 | 6.7 | 7.2 | 6.4 | 2.5 |
|   | Residence time ø | ms | 70 | 70 | 70 | 70 | 70 |
|   | Temperature | °C. | 800 | 800 | 800 | 800 | 800 |
| Quench zone | Quench gas | m³ (STP)/h | 150 | 150 | 150 | 150 | 150 |
|   | Temperature | °C. | 300 | 300 | 300 | 300 | 300 |
| Powder | Composition | % by wt. | $SnO_2$: 85.8 $TiO_2$: 14.2 | CaO: 92.1 $Al_2O_3$: 7.9 | NiO: 94.7 CuO: 5.3 | MgO: 98.1 $Na_2O$: 1.9 | ZnO: 92.5 $CeO_2$: 4.5 $MnO_2$: 3.0 |
|   | BET surface area | m²/g | 40 | 25 | 30 | 22 | 24 |

[1] 10% by weight of manganese acetate dissolved in water;
[2] alloy with 90:10 parts by weight of Zn/Mg;
[3] as a liquid;
[4] 10% by weight dissolved in water;
[5] 12% by weight (as $CeO_2$) solution in 2-ethylhexanoic acid

The invention claimed is:

1. A process for preparing a mixed metal oxide powder, comprising:
   evaporating oxidizable starting materials in an evaporation zone of a reactor;
   oxidizing the starting materials in a vaporous state in an oxidation zone of the reactor to form a reaction mixture; and
   cooling the reaction mixture after removing reaction and pulverulent solids from gaseous substances,
   wherein the starting materials comprise:
      at least one pulverulent metal; and
      at least one metal compound comprising a metal component that is different from the at least one pulverulent metal,
   the at least one puverulent metal is at least 80% by weight based on the sum of the at least one pulverulent metal and the metal component of the metal compound,
   the evaporating comprises feeding the starting materials and at least one combustion gas to the evaporation zone of the reactor to completely evaporate the at least one pulverulent metal and the metal compound under non-oxidizing conditions,
   the oxidizing comprises reacting a mixture flowing out of the evaporation zone with a stream of a supplied oxygen-containing gas in the oxidization zone of the reactor, and
   the oxygen-containing gas has an oxygen content at least sufficient to oxidize the starting materials and the at least one combustion gas completely.

2. The process according to claim 1, further comprising igniting the at least one combustion gas with an oxygenous gas to form a flame for evaporation, where a lambda value in the evaporation zone satisfies 0.5≦lambda≦1.

3. The process according to claim 1, wherein the process is performed at a pressure is of 200 mbar to 1100 mbar in the reactor.

4. The process according to claim 1, wherein the pulverulent metal introduced into the evaporation zone is selected from the group consisting of Ag, Al, Ba, Bi, Ca, Er, Eu, Ga, In, Li, K, Mg, Mn, Na, Pb, Sb, Sm, Sn, Sr, Te, Th, Yb and Zn.

5. The process according to claim 1, wherein the metal compound is supplied to the evaporation zone in solid form, in dissolved or dispersed form in an aqueous phase, or in the form of vapor.

6. The process according to claim 1, wherein the solid starting materials have a particle size of less than 1000 μm.

7. The process according to claim 1, further comprising introducing one or more metal compounds into the oxidation zone.

8. The process according to claim 1, wherein the at least one metal compound used is a chloride, a nitrate, a sulfate, a carbonate, a $C_1$-$C_{12}$-alkoxide, a $C_1$-$C_{12}$-carboxylate, an acetylacetonate and/or a carbonyl, and comprises the metal compound comprising Ag, Al, As, Au, B, Ba, Be, Bi, Ca, Cd, Ce, Co, Cr, Cs, Cu, Er, Eu, Fe, Ga, Gd, Ge, Hf, In, K, La, Li, Mg, Mn, Mo, Na, Nb, Nd, Ni, P, Pb, Pd, Pm, Pr, Pt, Rb, Ru, Sb, Sc, Sm, Sn, Sr, Ta, Tb, Ti, Tl, Tm, V, W, Y, Yb, Zn, and/or Zr.

9. The process according to claim 1, wherein
   the at least one pulverulent metal introduced into the evaporation zone is zinc,
   the at least one metal compound introduced into the evaporation zone is an inorganic or organic metal compound, which has not more than 4 carbon atoms and comprises the metal component comprising one of aluminum, cerium and manganese,
   zinc is at least 95% by weight, based on the sum of zinc and the metal component of the at least one metal compound,
   lambda is 0.8 to 0.95 in the evaporation zone, and
   lambda is 1.5 to 6 in the oxidation zone.

10. The process according to claim 1, wherein
   the pulverulent metal introduced into the evaporation zone is zinc,
   a solution of the metal compound introduced into the evaporation zone is an aqueous solution of an inorganic or organic metal compound, which has not more than 4 carbon atoms and comprises the metal component comprising one of aluminum, cerium and manganese,
   zinc is at least 95% by weight, based on the sum of zinc and the metal component of the at least one metal compound,
   lambda is 0.8 to 0.95 in the evaporation zone, and
   lambda is 1.5 to 6 in the oxidation zone.

11. The process according to claim 1, wherein
   the at least one pulverulent metal introduced into the evaporation zone is zinc,
   a solution of the metal compound introduced into the evaporation zone is an aqueous solution of an inorganic or organic metal compound, which has not more than 4 carbon atoms and comprises the metal component comprising one of aluminum, cerium and manganese,
   a solution of the metal compound introduced into the oxidation zone is a solution of a $C_2$-$C_8$-carboxylate or $C_1$-$C_4$-alkoxide of aluminum, cerium or manganese as the metal component in $C_1$-$C_4$-alcohols and/or $C_2$-$C_8$-carboxylic acids,
   zinc is at least 95% by weight, based on the sum of zinc and the metal component of the at least one metal compound,
   lambda is 0.8 to 0.95 in the evaporation zone, and
   lambda is 1.3 to 6 in the oxidation zone.

12. The process according to claim 1, wherein the at least one combustion gas is ignited with an oxygenous gas to form a flame for oxidation, where a lambda value in the oxidation zone satisfies 1<lambda≦10.

13. The process according to claim 1, further comprising igniting the at least one combustion gas with an oxygenous gas to provide a temperature of 500° C. to 3000° C. in the evaporation zone.

14. The process according to claim 1, further comprising igniting the at least one combustion gas with an oxygenous gas to provide a temperature of 500° C. to 3000° C. in the oxidation zone.

* * * * *